(12) United States Patent
Abedini et al.

(10) Patent No.: US 12,376,074 B2
(45) Date of Patent: Jul. 29, 2025

(54) PAGING EARLY INDICATION RESPONSES

(71) Applicant: QUALCOMM Incorporated, San Diego, CA (US)

(72) Inventors: Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/812,346

(22) Filed: Jul. 13, 2022

(65) Prior Publication Data
US 2024/0023061 A1     Jan. 18, 2024

(51) Int. Cl.
*H04W 68/00*     (2009.01)
*H04L 5/00*     (2006.01)
*H04W 68/02*     (2009.01)

(52) U.S. Cl.
CPC ........... *H04W 68/02* (2013.01); *H04L 5/0048* (2013.01)

(58) Field of Classification Search
CPC ..... H04W 52/02; H04W 68/00; H04W 68/02; H04L 5/0048
See application file for complete search history.

(56) References Cited

U.S. PATENT DOCUMENTS

| | | | |
|---|---|---|---|
| 2018/0027522 A1* | 1/2018 | Lee ...................... | H04W 72/21 370/336 |
| 2020/0092846 A1* | 3/2020 | Deng .................. | H04W 68/025 |
| 2021/0410107 A1* | 12/2021 | Park ....................... | H04W 68/02 |
| 2023/0108646 A1* | 4/2023 | Tseng .................. | H04W 68/025 455/458 |
| 2023/0209464 A1* | 6/2023 | Tsai .................. | H04W 52/0216 370/311 |

(Continued)

FOREIGN PATENT DOCUMENTS

| WO | WO-2018175442 A1 | 9/2018 |
|---|---|---|
| WO | WO-2020225031 A1 | 11/2020 |

(Continued)

OTHER PUBLICATIONS

3GPP TS 38.413: "3rd Generation Partnership Project, Technical Specification Group Radio Access Network, NG-RAN, NG Application Protocol (Release 16)", 3GPP TS 38.413, 3rd Generation Partnership Project, Mobile Competence Centre, 650, Route Des Lucioles, F-06921 Sophia-Antipolis Cedex, France, vol. RAN WG3, No. V16.10.0, Jun. 23, 2022, pp. 1-482, XP052183199, pp. 71-72.

(Continued)

*Primary Examiner* — Shantell L Heiber
(74) *Attorney, Agent, or Firm* — QUALCOMM Incorporated

(57) ABSTRACT

Various aspects of the present disclosure generally relate to wireless communication. In some aspects, a user equipment (UE) may receive, from a network entity, an indication that configures a paging early indication (PEI) response for one or more of: a UE subgroup; a paging occasion; or a beam direction. The UE may receive, from the network entity, a PEI. The UE may transmit, to the network entity, the PEI response based at least in part on the PEI and the indication that configures the PEI response. The UE may receive, from the network entity and during the paging occasion, a paging indication based at least in part on the PEI response. Numerous other aspects are described.

30 Claims, 10 Drawing Sheets

(56) References Cited

U.S. PATENT DOCUMENTS

| | | | |
|---|---|---|---|
| 2023/0232325 A1* | 7/2023 | Ye | H04W 52/0245 |
| | | | 455/574 |
| 2024/0179513 A1* | 5/2024 | Kalbasi | H04W 8/183 |
| 2024/0284403 A1* | 8/2024 | Agiwal | H04W 68/02 |
| 2024/0306125 A1* | 9/2024 | Zhou | H04W 52/0216 |
| 2024/0381307 A1* | 11/2024 | Reial | H04W 68/005 |
| 2025/0106818 A1* | 3/2025 | Mu | H04W 68/025 |

FOREIGN PATENT DOCUMENTS

| | | |
|---|---|---|
| WO | WO-2021083940 A1 | 5/2021 |
| WO | WO-2021087876 A1 | 5/2021 |

OTHER PUBLICATIONS

International Search Report and Written Opinion—PCT/US2023/025433—ISA/EPO—Oct. 9, 2023.

Lenovo, et al., "Paging Enhancement for UE Power Saving", R1-2100998, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-5, XP051971333, section 2.1.

\* cited by examiner

PAGING EARLY INDICATION RESPONSES

FIELD OF THE DISCLOSURE

Aspects of the present disclosure generally relate to wireless communication and to techniques and apparatuses for paging early indication (PEI) responses.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities (e.g., base stations) that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity, an indication that configures a paging early indication (PEI) response for one or more of: a UE subgroup; a paging occasion; or a beam direction; receive, from the network entity, a PEI, transmit, to the network entity, the PEI response based at least in part on the PEI and the indication that configures the PEI response; and receive, from the network entity and during the paging occasion, a paging indication based at least in part on the PEI response.

In some implementations, an apparatus for wireless communication at a network entity includes a memory and one or more processors, coupled to the memory, configured to: transmit, to a UE, an indication that configures a PEI response for one or more of: a UE subgroup; a paging occasion; or a beam direction; transmit, to the UE, a PEI, receive, from the UE, the PEI response based at least in part on the PEI and the indication that configures the PEI response; and transmit, to the UE and during the paging occasion, a paging indication based at least in part on the PEI response.

In some implementations, a method of wireless communication performed by a UE includes receiving, from a network entity, an indication that configures a PEI response for one or more of: a UE subgroup; a paging occasion; or a beam direction; receiving, from the network entity, a PEI; transmitting, to the network entity, the PEI response based at least in part on the PEI and the indication that configures the PEI response; and receiving, from the network entity and during the paging occasion, a paging indication based at least in part on the PEI response.

In some implementations, a method of wireless communication performed by a network entity includes transmitting, to a UE, an indication that configures a PEI response for one or more of: a UE subgroup; a paging occasion; or a beam direction; transmitting, to the UE, a PEI; receiving, from the UE, the PEI response based at least in part on the PEI and the indication that configures the PEI response; and transmitting, to the UE and during the paging occasion, a paging indication based at least in part on the PEI response.

In some implementations, a non-transitory computer-readable medium storing a set of instructions for wireless communication includes one or more instructions that, when executed by one or more processors of a UE, cause the UE to: receive, from a network entity, an indication that configures a PEI response for one or more of: a UE subgroup; a paging occasion; or a beam direction; receive, from the network entity, a PEI; transmit, to the network entity, the PEI response based at least in part on the PEI and the indication that configures the PEI response; and receive, from the network entity and during the paging occasion, a paging indication based at least in part on the PEI response.

In some implementations, a non-transitory computer-readable medium storing a set of instructions for wireless communication includes one or more instructions that, when executed by one or more processors of a network entity, cause the network entity to: transmit, to a UE, an indication that configures a PEI response for one or more of: a UE subgroup; a paging occasion; or a beam direction; transmit, to the UE, a PEI; receive, from the UE, the PEI response based at least in part on the PEI and the indication that configures the PEI response; and transmit, to the UE and during the paging occasion, a paging indication based at least in part on the PEI response.

In some implementations, an apparatus for wireless communication includes means for receiving, from a network entity, an indication that configures a PEI response for one or more of: a UE subgroup; a paging occasion; or a beam direction; receiving, from the network entity, a PEI; means for transmitting, to the network entity, the PEI response based at least in part on the PEI and the indication that configures the PEI response; and means for receiving, from the network entity and during the paging occasion, a paging indication based at least in part on the PEI response.

In some implementations, an apparatus for wireless communication includes means for transmitting, to a UE, an indication that configures a PEI response for one or more of: a UE subgroup; a paging occasion; or a beam direction; means for transmitting, to the UE, a PEI; means for receiving, from the UE, the PEI response based at least in part on the PEI and the indication that configures the PEI response; and means for transmitting, to the UE and during the paging occasion, a paging indication based at least in part on the PEI response.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
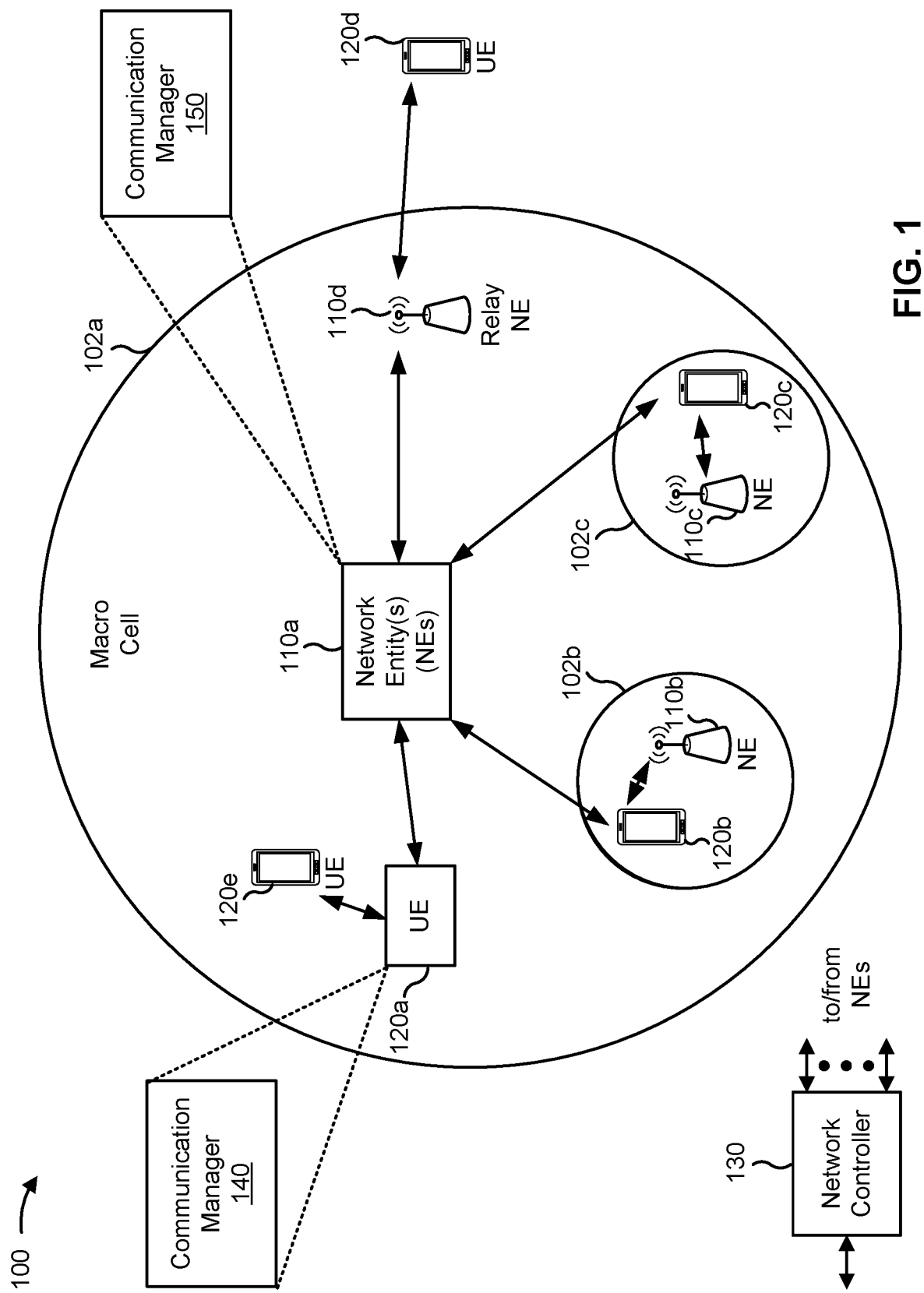
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a network entity 110a, a network entity 110b, a network entity 110c, and a network entity 110d), a user equipment (UE) 120 or multiple UEs 120 (shown as a UE 120a, a UE 120b, a ULE 120c, a ULE 120d, and a ULE 120e), and/or other network entities. A network entity 110 is an entity that communicates with UEs 120. A network entity 110 may include, for example, an NR base station, an LTE base station, a Node B, an eNB (e.g., in 4G), a gNB (e.g., in 5G), an access point, and/or a transmission reception point (TRP). Each network entity 110 may provide communication coverage for a particular geographic area. In the Third Generation Partnership Project (3GPP), the term "cell" can refer to a coverage area of a network entity 110 and/or a network entity subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the network entity 110a may be a macro base station for a macro cell 102a, the network entity 110b may be a pico base station for a pico cell 102b, and the BS network entity may be a femto base station for a femto cell 102c. A base station may support one or multiple (e.g., three) cells.

In some aspects, the term "network entity" (e.g., the network entity 110) may refer to an aggregated base station, a disaggregated base station, an integrated access and backhaul (IAB) node, a relay node, and/or one or more components thereof. For example, in some aspects, "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "network entity" may refer to one device configured to perform one or more functions, such as those described herein in connection with the network entity 110. In some aspects, the term "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "network entity" may refer to any one or more of those different devices. In some aspects, the term "network entity" may refer to one or more virtual base stations and/or one or more virtual base station functions. For example, in some aspects, two or more base station functions may be instantiated on a single device. In some aspects, the term "network entity" may refer to one of the base station functions and not another. In this way, a single device may include more than one base station.

In some examples, a cell may not necessarily be stationary, and the geographic area of the cell may move according to the location of a network entity 110 that is mobile (e.g., a mobile base station). In some examples, the network entity 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is a network entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the network entity 110d (e.g., a relay base station) may communicate with the network entity 110a (e.g., a macro base station) and the UE 120d in order to facilitate communication between the network entity 110a and the UE 120d. A network entity 110 that relays communications may be referred to as a relay station, a relay base station, a relay, or the like.

The wireless network 100 may be a heterogeneous network that includes network entities 110 of different types, such as macro base stations, pico base stations, femto base stations, relay base stations, TRPs, RUs, or the like. These different types of network entities 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, an indication that configures a paging early indication (PEI) response for one or more of: a UE subgroup; a paging occasion; or a beam direction; receive, from the network entity, a PEI; transmit, to the network entity, the PEI response based at least in part on the PEI and the indication that configures the PEI response; and receive, from the network entity and during the paging occasion, a paging indication based at least in part on the PEI response. Additionally, or alternatively, the communication manager 140 may perform one or more other operations described herein.

In some aspects, a network entity (e.g., network entity 110) may include a communication manager 150. As described in more detail elsewhere herein, the communication manager 150 may transmit, to a UE, an indication that configures a PEI response for one or more of: a UE subgroup; a paging occasion; or a beam direction; transmit, to the UE, a PEI; receive, from the UE, the PEI response based at least in part on the PEI and the indication that configures the PEI response; and transmit, to the UE and during the paging occasion, a paging indication based at least in part on the PEI response. Additionally, or alternatively, the communication manager 150 may perform one or more other operations described herein.

As indicated above, FIG. 1 is provided as an example. Other examples may differ from what is described with regard to FIG. 1.

Figure 2:
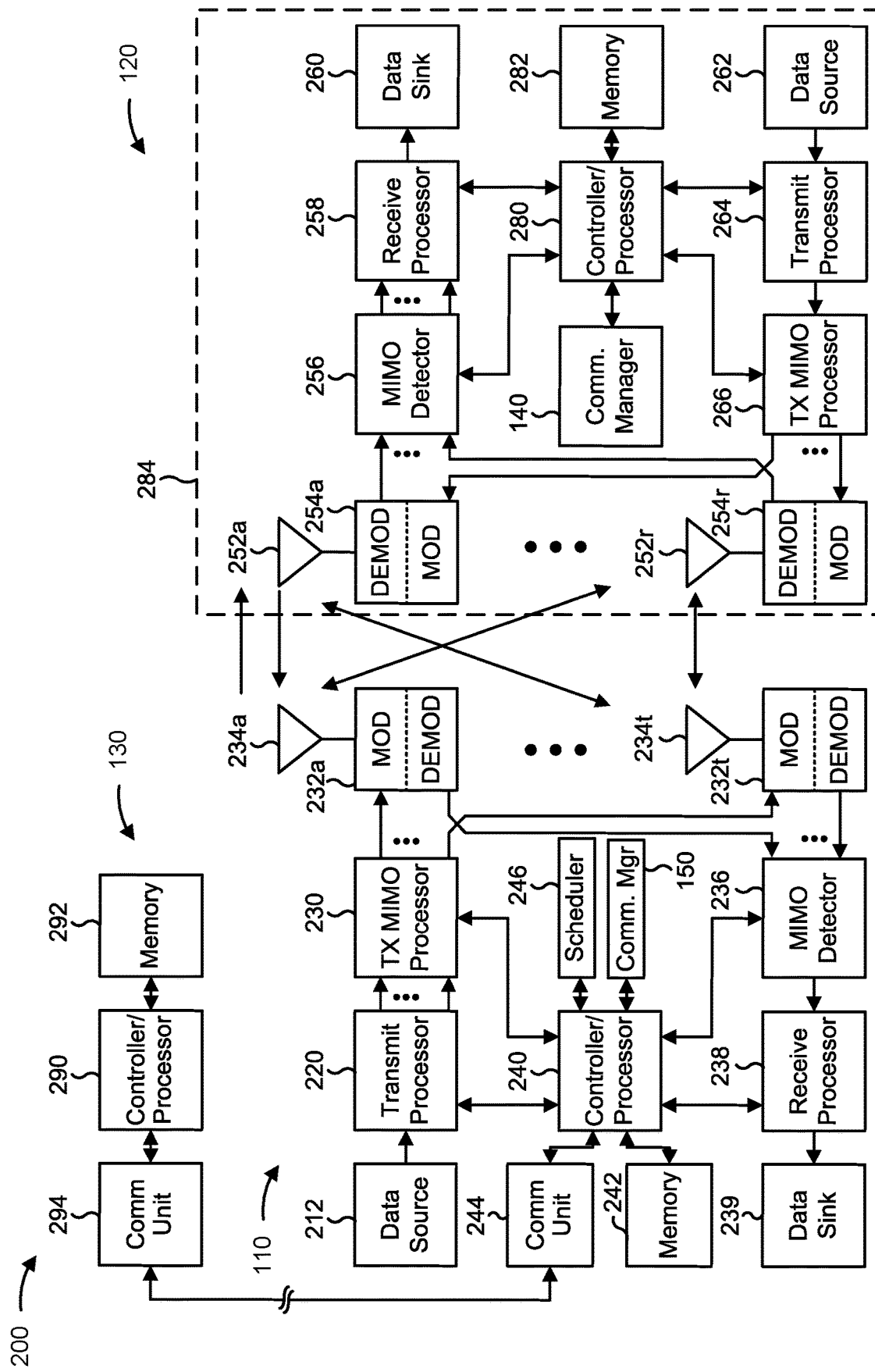
FIG. 2 is a diagram illustrating an example of a network entity in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network entity 110, the controller/processor 280 of the UE 120, and/or any other component(s) of FIG. 2 may perform one or more techniques associated with PEI responses, as described in more detail elsewhere herein. For example, the controller/processor 240 of the network entity 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, an indication that configures a PEI response for one or more of: a UE subgroup; a paging occasion; or a beam direction; means for receiving, from the network entity, a PEI; means for transmitting, to the network entity, the PEI response based at least in part on the PEI and the indication that configures the PEI response; and/or means for receiving, from the network entity and during the paging occasion, a paging indication based at least in part on the PEI response. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., network entity 110) includes means for transmitting, to a UE, an indication that configures a PEI response for one or more of: a UE subgroup; a paging occasion; or a beam direction; means for transmitting, to the UE, a PEI; means for receiving, from the UE, the PEI response based at least in part on the PEI and the indication that configures the PEI response; and/or means for transmitting, to the UE and during the paging occasion, a paging indication based at least in part on the PEI response. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
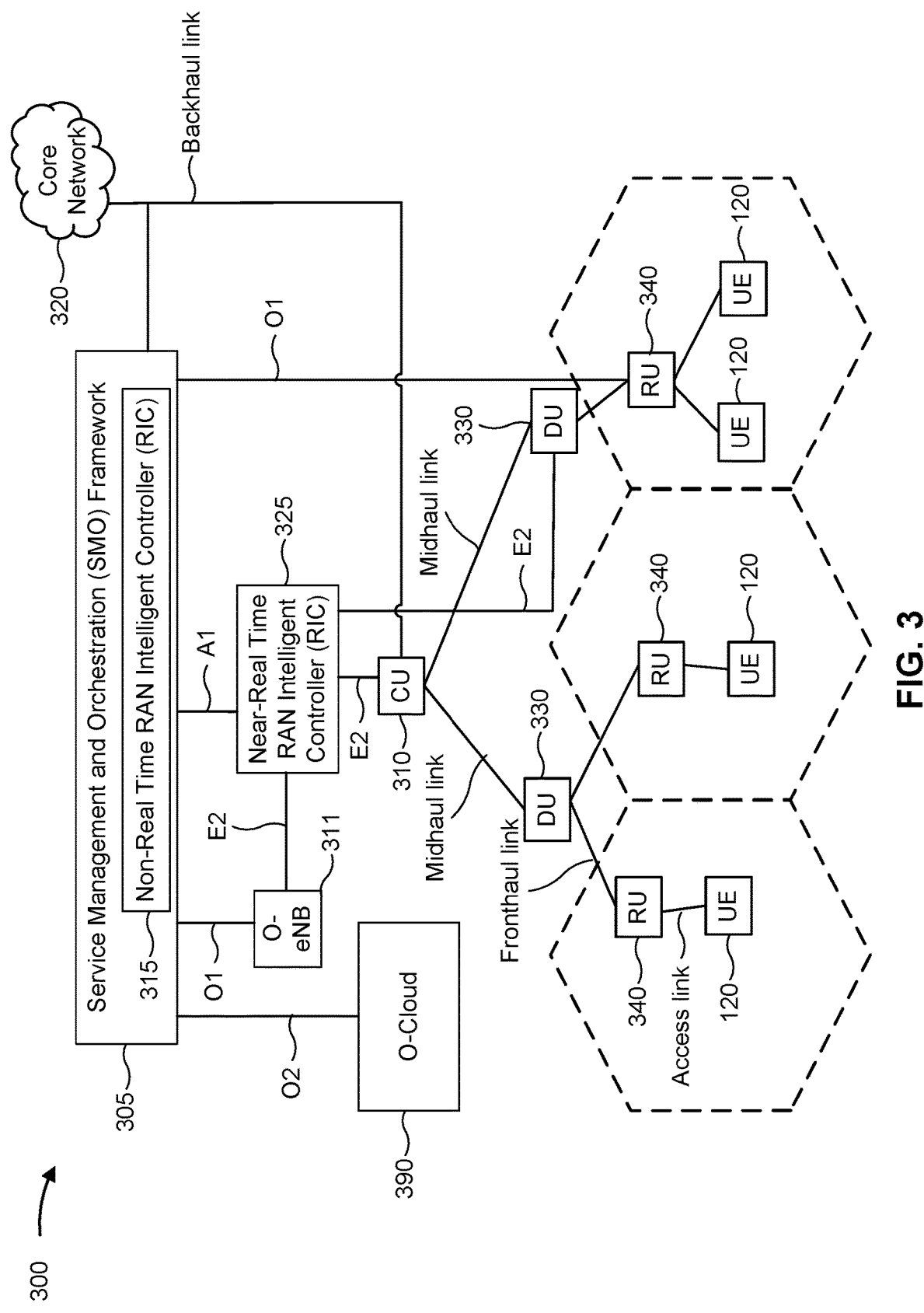
FIG. 3 is a diagram illustrating an example of a disaggregated network entity architecture, in accordance with the present disclosure.

FIG. 3 is a diagram illustrating an example 300 of a disaggregated network entity architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (e.g., network entity 110), or one or more units (or one or more components) performing network entity functionality, may be implemented in an aggregated or disaggregated architecture. For example, a network entity (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated network entity architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
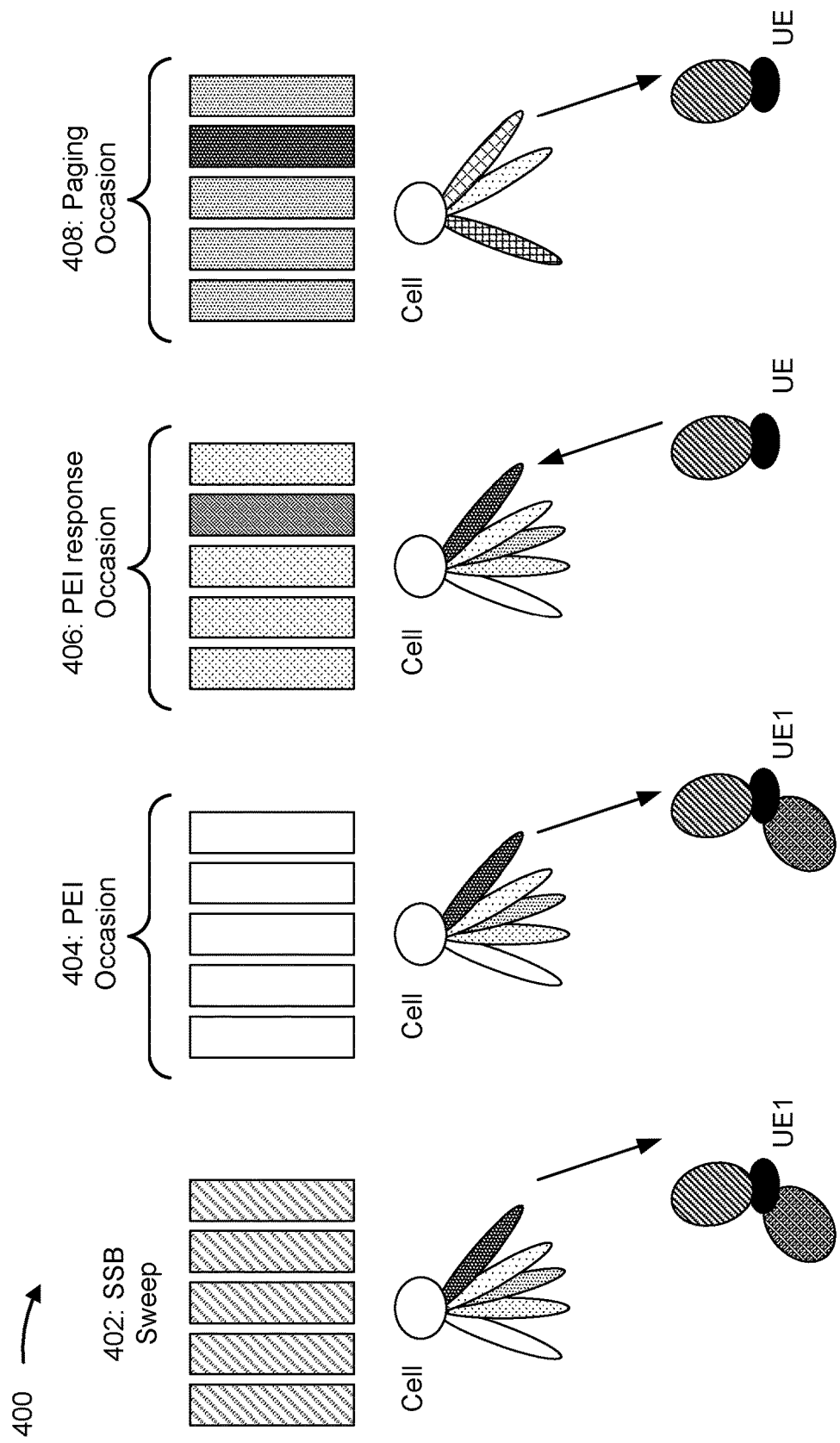
FIG. 4 is a diagram illustrating an example of a paging early indication (PEI), in accordance with the present disclosure.

FIG. 4 is a diagram illustrating an example 400 of a PEI, in accordance with the present disclosure.

As shown by reference number 402, a network entity may perform a synchronization signal block (SSB) sweep. During the SSB sweeping, the network entity may transmit a plurality of SSBs using a plurality of beams. A quantity of beams may equal a quantity of actual transmitted SSBs.

As shown by reference number 404, the network entity may transmit a plurality of PEIs using the plurality of beams. The network entity may transmit the plurality of PEIs to one or more UEs (e.g., a subgroup of UEs). The network entity may transmit the plurality of PEIs during a PEI occasion.

In some aspects, a PEI may be a physical downlink control channel (PDCCH)-based PEI. The PEI may be associated with a control resource set (CORESET) (e.g., CORESET #0) or a common CORESET configured in a system information block type 1 (SIB1). The PEI may be associated with a dedicated search space. A PEI payload size may be configured by the network entity, and the PEI payload size may not be larger than a payload size of a paging indication. A total quantity of bits for a PEI field may be denoted as POnumPerPEI, when a subgrouping is not configured, and the total quantity of bits for the PEI field may be (POnumPerPEI×subgroupsNumPerPO) when the subgrouping is configured, where POnumPerPEI=1,2,4,8 and a maximum subgroupsNumPerPO=8. A one-to-one mapping may exist between PEI PDCCH monitoring occasions and paging PDCCH monitoring occasions within a paging occasion. A location of a PEI PDCCH monitoring occasion may be configured via an SIB, such as SIB1. The location may be based at least in part on a reference point, which may be configured by a frame-level offset to a first paging frame of associated paging frames. A symbol-level offset to the reference point may indicate a location of a first PEI PDCCH monitoring occasion.

As shown by reference number 406, the network entity may perform a monitoring during one or more PEI response occasions. During one of the PEI response occasions, the network entity may receive the PEI response from a UE of the plurality of UEs. In other words, the network entity may monitor for the PEI response within a configured PEI response occasion. The UE may transmit the PEI response based at least in part on a receipt of a PEI from the network entity. The UE may transmit the PEI response using a transmit beam, which may correspond to one of the plurality of beams used by the network entity. The UE may transmit the PEI response so that the network entity may locate the UE, which may be idle/inactive, at a beam/cell level.

As shown by reference number 408, when the network entity detects the PEI response received from the UE, the network entity may transmit the paging indication during a paging occasion. The network entity may transmit the paging indication via a PDCCH or a physical downlink shared channel (PDSCH). The paging indication may also be referred to as a paging PDCCH/PDSCH. The network entity may transmit the paging indication using a transmit beam, which may correspond to the transmit beam used by the UE to transmit the PEI response. The network entity may transmit the paging indication using only one transmit beam, as opposed to transmitting the paging indication using the plurality of beams. In other words, beam information acquired by the network entity during the PEI response detection may be used by the network entity to reduce a beam sweep of the paging indication. As a result, the network entity may save signaling overhead.

The UE may receive the PEI from the network entity, and the UE may transmit the PEI response to the network entity based at least in part on the receipt of the PEI. The UE may transmit the PEI response prior to the network entity transmitting the paging indication. As a result, the network entity may use beam information acquired via detecting the PEI response to intelligently transmit the paging indication using a certain beam that corresponds to the UE, as opposed to transmitting the paging indication using the plurality of beams.

As indicated above, FIG. 4 is provided as an example. Other examples may differ from what is described with regard to FIG. 4.

A network entity (e.g., network entity 110) may transmit a PEI to a UE, and the UE may transmit a PEI response to the network entity based at least in part on a receipt of the PEI. The network entity may transmit a paging indication to the UE based at least in part on the PEI response received from the UE. However, the PEI may not configure the UE to transmit the PEI response based at least in part on certain criteria. Further, some UEs may support the PEI response, whereas other UEs may not support the PEI response. Further, transmitting the PEI response by the UE may save resources at the network entity, but may result in increased signaling by the UE, which may consume additional power at the UE.

In various aspects of techniques and apparatuses described herein, the UE may receive, from the network entity, an indication that configures a PEI response for a UE subgroup, a paging occasion, and/or a beam direction. The UE may receive, from the network, a PEI. The PEI may be configured to dynamically activate or deactivate the PEI response using a single-bit flag. The PEI may be configured to dynamically activate or deactivate, using a bitmap, the PEI response for the UE subgroup, the paging occasion, and/or the beam direction. The PEI response may be configured semi-statically via system information or dedicated RRC signaling for the UE subgroup, the paging occasion, and/or the beam direction. In some aspects, the UE may transmit, to the capability signaling indicating that the UE supports the PEI response. In some aspects, the UE may receive, from the network entity, a tracking reference signal (TRS) or a channel state information reference signal (CSI-RS) based at least in part on a reception of the PEI response by the network entity, where the TRS or the CSI-RS may improve a receipt of a paging indication by the UE, thereby incentivizing the UE to expend resources transmitting the PEI response to the network entity. As a result, the UE may be configured to transmit the PEI response based at least in part on certain criteria (e.g., UE subgroups, paging occasions, and/or beam directions).

Figure 5:
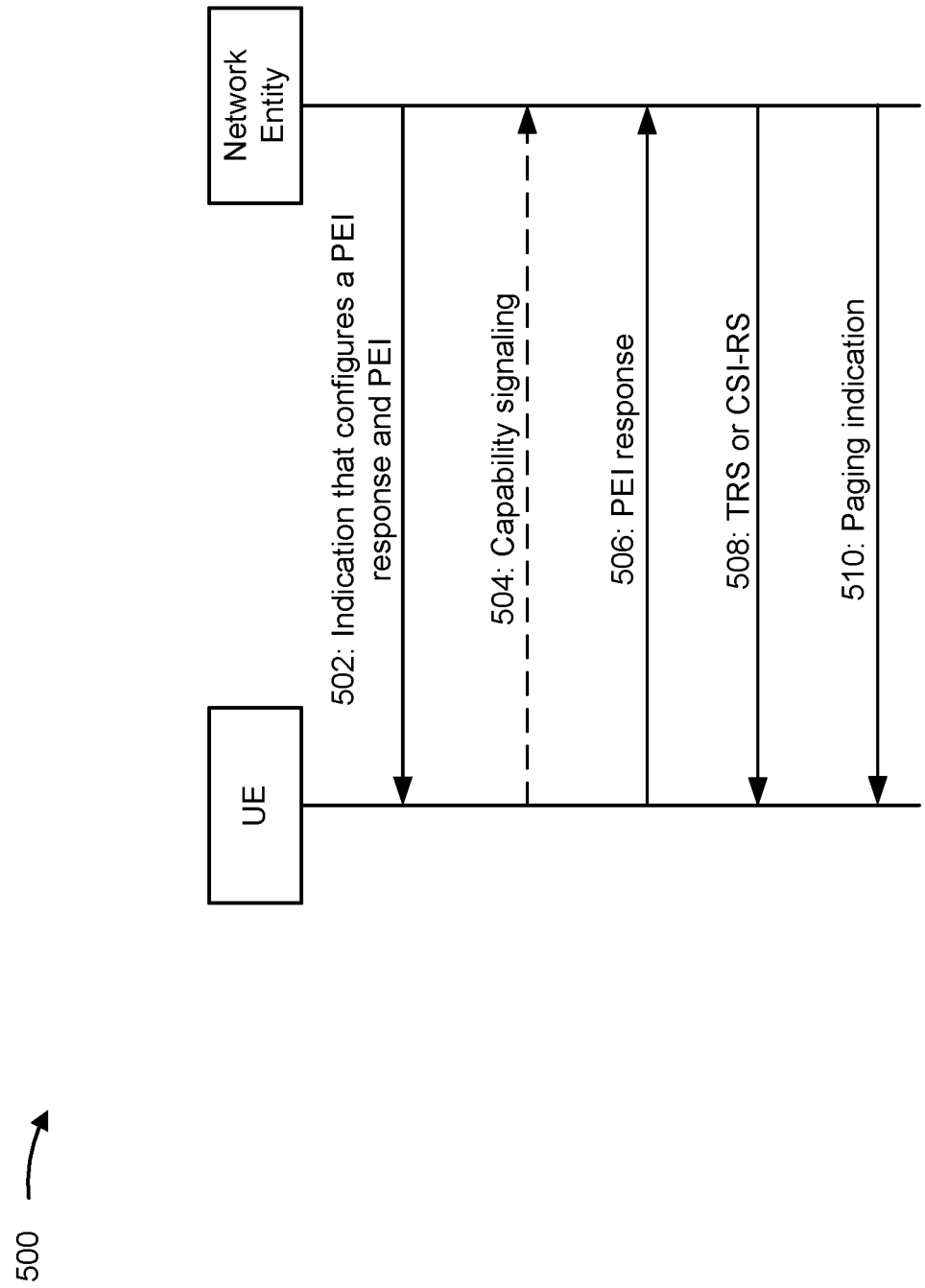
FIGS. 5-6 are diagrams illustrating examples associated with PEI responses, in accordance with the present disclosure.

FIG. 5 is a diagram illustrating an example 500 associated with PEI responses, in accordance with the present disclosure. As shown in FIG. 5, example 500 includes communication between a UE (e.g., UE 120) and a network entity (e.g., network entity 110). In some aspects, the UE and the network entity may be included in a wireless network, such as wireless network 100.

As shown by reference number 502, the UE may receive, from the network entity, an indication that configures a PEI response for a UE subgroup, a paging occasion, and/or a beam direction. The UE may receive a PEI via a PDCCH. The PEI may be configured to dynamically activate or deactivate the PEI response using a single-bit flag. The PEI may be configured to dynamically activate or deactivate, using a bitmap, the PEI response for the UE subgroup, the paging occasion, and/or the beam direction. The PEI response may be configured semi-statically via system information or dedicated RRC signaling for the UE subgroup, the paging occasion, and/or the beam direction.

In some aspects, the network entity may transmit a PEI PDCCH that dynamically activates/deactivates the PEI response, for example, by indicating the single-bit flag that activates/deactivates the PEI response. The network entity may transmit the PEI PDCCH to one or more UEs associated with one or more (e.g., one or multiple) UE subgroups. The network entity may activate/deactivate the PEI response for the one or more UE subgroups, which may enable/disable PEI responses from the one or more UEs associated with the one or more UE subgroups. The network entity may activate/deactivate the PEI response for one or more associated paging occasions. The PEI PDCCH may indicate one or more bitmaps to indicate a support of PEI response for subgroups and/or paging occasions. The PEI response may be activated/deactivated for one or more beam directions. In order to support a beam-specific availability of the PEI response, a PEI PDCCH transmitted in one beam direction may indicate a PEI response bitmap which is applicable only to that beam direction.

In some aspects, the network entity may configure the PEI response in a semi-static manner. The network entity may configure the PEI response via system information or via dedicated RRC signaling. The network entity may configure the PEI response semi-statically for the one or more UE subgroups, one or more paging occasions, and/or one or more beam directions.

In some aspects, the network entity may be based at least in part on a hierarchical indication. For example, eight UE subgroups may be RRC configured. The network entity may configure four UE subgroups via RRC signaling to support the PEI response. The PEI PDCCH may dynamically activate/deactivate the PEI response for these four UE subgroups.

In some aspects, a PEI may be carried via a PDCCH (e.g., downlink control information (DCI) format 2-7). The PDCCH may carry the PEI for up to 8 paging occasions, and per paging occasion, the PDCCH may carry the PEI for up to 8 UE subgroups.

As shown by reference number 504, the UE may transmit, to the network entity, capability signaling indicating that the UE supports the PEI response. The UE may be expected to monitor for the PEI and transmit the PEI response based at least in part on the capability signaling.

In some aspects, legacy UEs may not support the PEI response, and in this case, a paging PDCCH/PDSCH for the legacy UEs should still be beam-swept (e.g., the paging PDCCH/PDSCH should be transmitted on a plurality of beams instead of a specific beam corresponding to a PEI response).

In some aspects, UEs (e.g., non-legacy UEs) may indicate, to the network entity, an optional capability of supporting the PEI response, and the network may separate these UEs from the legacy UEs. In other words, based at least in part on capability signaling, the network entity may separate UEs that support the PEI response from the legacy UEs that do not support the PEI response. The network entity may determine different UE subgroupings, where subgroup(s) of UEs (e.g., non-legacy UEs) may be different from subgroup(s) of legacy UEs (or legacy subgroups). The network entity may transmit the paging PDCCH/PDSCH in a beam-swept manner for subgroup(s) of legacy UEs. The network entity may transmit the paging PDCCH/PDSCH using specific beam(s) (without beam sweeping) for subgroup(s) of UEs. Further, the network entity may configure a separate PEI for the subgroup(s) of UEs (e.g., a different PEI paging monitoring occasion and/or radio network temporary identifier (RNTI)), In past approaches, the UE may determine whether to monitor the PEI based at least in part on a UE implementation. When the UE determines to not monitor the PEI, the UE may be expected to monitor a paging occasion associated with the UE. However, in some aspects, when the UE indicates support for the PEI and the PEI response, the UE may be expected to monitor the PEI and transmit the PEI response after a receipt of the PEI. When the UE does not transmit the PEI response, the UE may not receive a paging indication from the network entity, since the network entity may be unable to acquire beam information associated with the PEI response. When the network entity supports multiple paging attempts, the UE may receive the paging indication, but the UE may experience a delay when receiving the paging indication.

As shown by reference number 506, the UE may transmit, to the network entity, the PEI response based at least in part on the PEI. The UE may transmit the PEI response based at least in part on the PEI, the indication that configures the PEI response, and/or the capability signaling.

As shown by reference number 508, the UE may receive, from the network entity, a TRS or a CSI-RS prior to or after the paging occasion. The TRS or the CSI-RS may be triggered based at least in part by a reception of the PEI response by the network entity. In some aspects, the TRS may be an aperiodic TRS or a periodic TRS. A TRS configuration associated with the TRS may be based at least in part on an RRC configuration. The TRS may be a common TRS or a dedicated TRS. The PEI may indicate whether the common TRS is available, whether the dedicated TRS is supported, or whether the dedicated TRS is available. The dedicated TRS may be associated with a validity duration that is UE-specific, beam-specific, or UE-subgroup-specific. In some aspects, the CSI-RS may be an aperiodic CSI-RS or a periodic CSI-RS. The CSI-RS may be a common CSI-RS or a dedicated CSI-RS. The CSI-RS may be associated with a repetition. The PEI may indicate whether the common CSI-RS is available, whether the dedicated CSI-RS is supported, or whether the dedicated CSI-RS is available. The dedicated CSI-RS may be associated with a validity duration that is UE-specific, beam-specific, or UE-subgroup-specific.

In past releases of NR, a TRS may be supported for the UE in an idle/inactive mode in order to reduce a UE power consumption. The TRS may be used for a time and frequency synchronization. No dedicated TRS may be configured for the UE in the idle/inactive mode. The network may configure a TRS used by a connected mode UE to the UE in the idle/inactive mode. The TRS may be periodic (e.g., only a periodic TRS may be supported, and a non-periodic TRS may not be supported). The TRS may enable power savings due to increased opportunities for tracking loop updates and/or longer sleep durations for the UE. The network entity may signal a SIB to provide a configuration of the TRS. Layer 1 (L1) signaling may indicate whether the TRS is transmitted on configured occasions. TRS availability information may be carried by both a paging PDCCH and a PEI. The TRS availability information may be based at least in part on a bitmap in DCI, where up to six bits may be used for the bitmap. In a TRS resource set configuration, a group ID may be provided, where a group ID value may map to a bit in a TRS availability indication field. A network configured validity duration may be supported for TRS availability indication signaling, where availability information may remain valid within the validity duration. Further, the TRS may be quasi co-located with a transmitted SSB.

In some aspects, the PEI response transmitted by the UE may result in energy savings at the network entity, since the network entity may not need to transmit a paging indication using a plurality of beams, but rather the network entity may transmit the paging indication using a beam that corresponds to a beam associated with the PEI response. However, the energy savings at the network entity may result in the UE consuming additional power, since the UE has to transmit the PEI response to the network entity. As a result, the network entity may incentivize the UE to implement and use a PEI response feature.

In some aspects, the network entity may transmit the dedicated TRS to the UE, based at least in part on the UE transmitting the PEI response to the network entity. The network entity may transmit the dedicated TRS before a paging occasion (or after the paging occasion). The dedicated TRS may improve a power consumption of the UE, and the dedicated TRS may improve a reception of a paging indication during the paging occasion. A transmission of the dedicated TRS may be triggered by a reception of the PEI response. The dedicated TRS, which may be triggered by the PEI response may be aperiodic or periodic. The TRS configuration associated with the dedicated TRS may be RRC configured, or the TRS configuration may be configured based at least in part on system information.

In some aspects, the PEI PDCCH may indicate whether the common TRS is available. In some aspects, the PEI PDCCH may indicate whether the dedicated TRS is supported. For example, when the UE transmits the PEI response, the network entity may transmit the dedicated TRS to that UE. In some aspects, the PEI PDCCH may indicate whether the dedicated TRS is available. For example, the dedicated TRS may be supported, and may already be triggered for a given time duration. In some aspects, the dedicated TRS may have the validity duration, where the validity duration may be UE-specific, beam-specific, and/or subgroup-specific.

In some aspects, the network entity may transmit the CSI-RS to the UE, based at least in part on the UE transmitting the PEI response to the network entity. The network entity may transmit the CSI-RS before the paging occasion (or after the paging occasion). The CSI-RS may improve a power consumption of the UE, and the CSI-RS may improve a reception of the paging indication during the paging occasion. A transmission of the CSI-RS may be triggered by the reception of the PEI response. The CSI-RS may be the dedicated CSI-RS or the common CSI-RS. The network entity may transmit the CSI-RS in a periodic manner or in an aperiodic manner. The network entity may transmit the CSI-RS with repetition, which may allow the UE to check multiple receive beams.

In some aspects, the PEI PDCCH may indicate whether the common CSI-RS is available. In some aspects, the PEI PDCCH may indicate whether the dedicated CSI-RS is supported. For example, when the UE transmits the PEI response, the network entity may transmit the CSI-RS to that UE. In some aspects, the PEI PDCCH may indicate whether the CSI-RS is available. For example, the CSI-RS may be supported, and may already be triggered for a given time duration. In some aspects, the CSI-RS may have the validity duration, where the validity duration may be UE-specific, beam-specific, and/or subgroup-specific.

As shown by reference number 510, the UE may receive, from the network entity and during the paging occasion, the paging indication based at least in part on the PEI response. The UE may receive the paging indication based at least in part on beam information associated with the PEI response, which may prevent the network entity from performing a beam sweep when transmitting the paging indication, thereby reducing an energy usage at the network entity.

In some aspects, the network entity may be a first network entity. The first network entity may transmit, to a second network entity, signaling that indicates whether the PEI response is to be implemented for paging the UE, and/or criteria to be satisfied for the PEI response to be implemented. The signaling may be UE-specific, cell-specific, and/or beam-specific. In one example, the first network entity may be a first Next Generation radio access network (NG-RAN), and the second network entity may be a second NG-RAN. In another example, the first network entity may be an NG-RAN, and the second network entity may be an access and mobility management function (AMF), or vice versa.

In some aspects, various parameters used for paging may be exchanged over backhaul interfaces. For example, the AMF or the first NG-RAN, when transmitting a paging message to a second NG-RAN to page the UE, may indicate a paging priority. The paging priority may indicate whether paging the UE should be handled with priority or not. As another example, the AMF or the first NG-RAN, when transmitting the paging message to the second NG-RAN to page the UE, may indicate a paging attempt count and an intended quantity of paging attempts.

In some cases, implementing the PEI response feature may negatively impact a UE performance, due to a likelihood that the PEI response will not be reliably detected by the network entity. The network entity may not transmit paging messages to the UE, which may lead to an increased latency. Further, without the PEI response, the UE may be paged in multiple directions and on multiple cells, which may result in a higher likelihood that a paging message may reach the UE in a shorter period of time and with a better quality.

In some aspects, an enablement of the PEI response feature for the UE may depend on a paging strategy. For example, when an NG-RAN receives an indication of a paging attempt count [k] and an indication of an intended quantity of paging attempts [K] for the UE to be paged, the PEI response may be enabled when k<K, or when k=1, or generally for k<K−X, where X is a predefined value. In other words, the PEI response may be based at least in part on the paging attempt count being less than the intended quantity of paging attempts, or based at least in part on the paging attempt count being equal to one, or based at least in part on the paging attempt count being less than the intended quantity of paging attempts minus a first predefined value (e.g., X). As another example, when the NG-RAN receives an indication of a paging priority for the UE to be paged (e.g., not used for voice over NR (VoNR), but for Internet data service), the PEI response may not be enabled, or the PEI response may be enabled when the paging priority is less than Y, where Y is a predefined value. In other words, the PEI response may be based at least in part on a value associated with the paging priority being less than a second predefined value (e.g., Y).

In some aspects, signaling may be supported between the AMF and the NG-RAN for core network (CN) paging, or between NG-RANs (e.g., between the first NG-RAN and the second NG-RAN) for radio access network (RAN) paging. The signaling may indicate whether the PEI response is to be implemented for paging the UE, where an indication as to whether the PEI response is to be implemented may be cell-specific and/or beam-specific. The signaling may indicate criteria (e.g., the X and Y predefined values) for which the PEI response is able to be implemented, where an indication of the criteria for which the PEI response is able to be implemented may be UE-specific, cell-specific, and/or beam-specific.

As indicated above, FIG. 5 is provided as an example. Other examples may differ from what is described with regard to FIG. 5.

Figure 6:
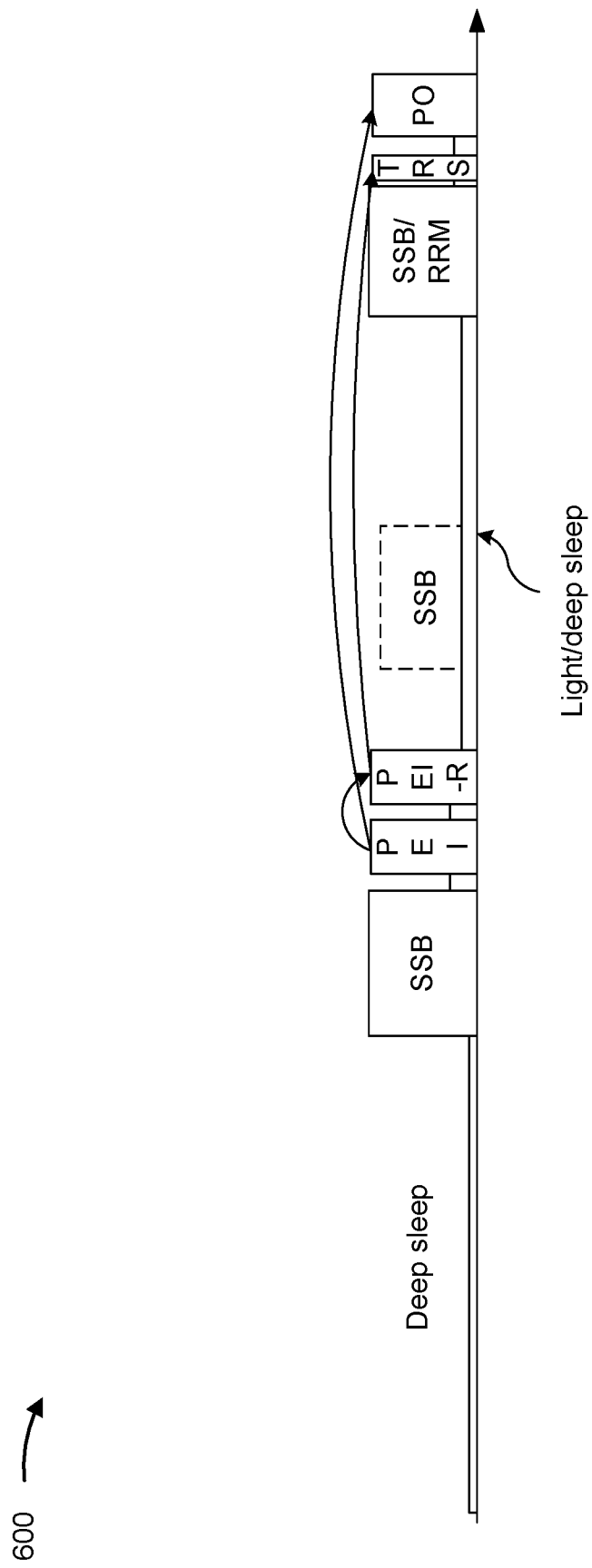

FIG. 6 is a diagram illustrating an example 600 associated with PEI responses, in accordance with the present disclosure.

As shown in FIG. 6, a network entity may transmit an SSB to a UE, which may initially be associated with a deep sleep mode. The network entity may transmit a PEI to the UE. The UE may transmit, to the network entity, a PEI response based at least in part on a receipt of the PEI. During a light/deep sleep mode, the UE may or may not receive other SSBs and/or radio resource management (RRM) signaling. The network entity may transmit, to the UE, a TRS based at least in part on the PEI response received from the UE. The network entity may transmit the TRS prior to a paging occasion. The network entity may transmit a paging indication during the paging occasion. The TRS may improve a reception of the paging indication during the paging occasion.

As indicated above, FIG. 6 is provided as an example. Other examples may differ from what is described with regard to FIG. 6.

Figure 7:
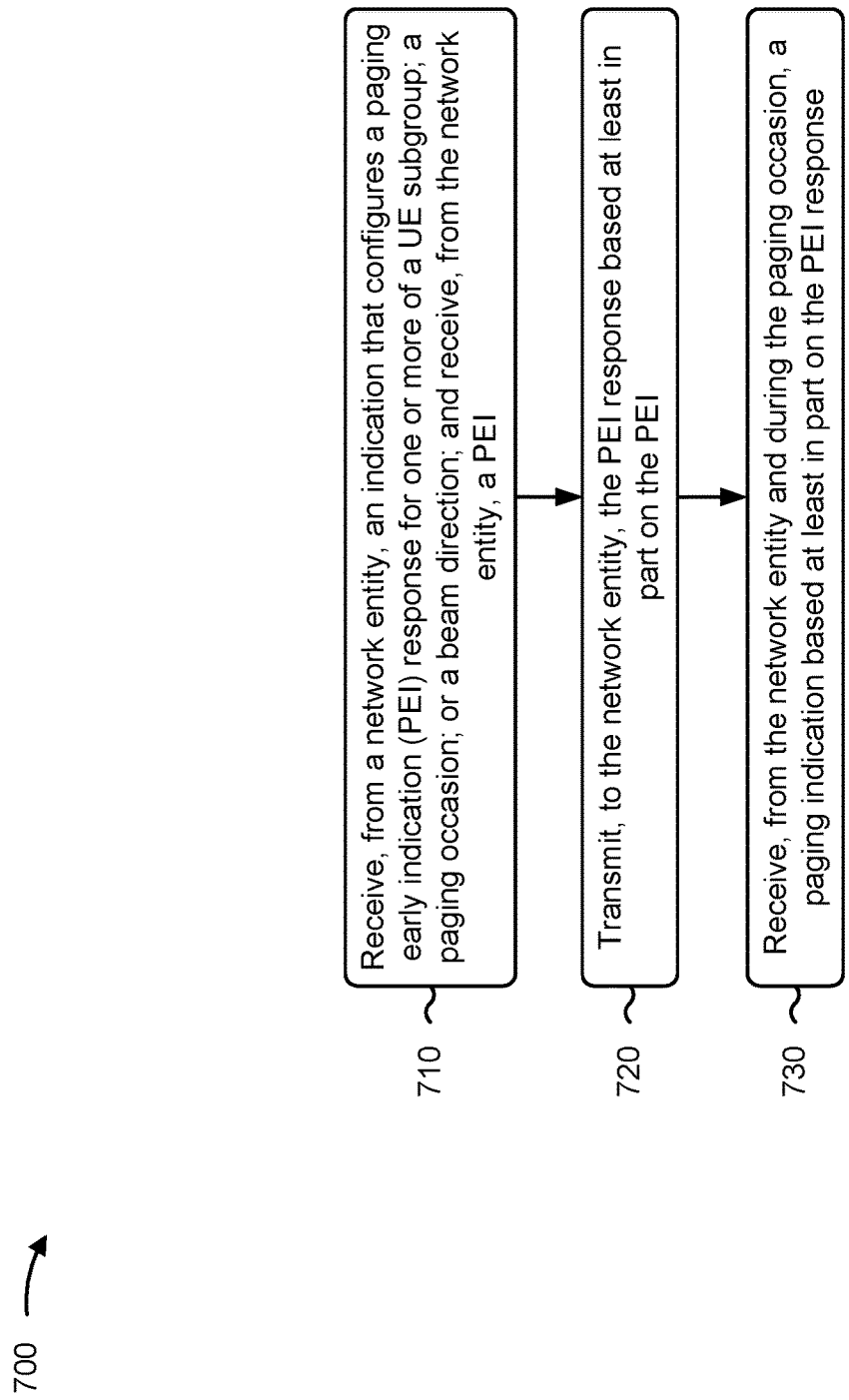
FIGS. 7-8 are diagrams illustrating example processes associated with PEI responses, in accordance with the present disclosure.

FIG. 7 is a diagram illustrating an example process 700 performed, for example, by a UE, in accordance with the present disclosure. Example process 700 is an example where the UE (e.g., UE 120) performs operations associated with PEI responses.

As shown in FIG. 7, in some aspects, process 700 may include receiving, from a network entity, an indication that configures a PEI response for one or more of: a UE subgroup; a paging occasion; or a beam direction, and receiving, from the network entity, a PEI (block 710). For example, the UE (e.g., using communication manager 140 and/or reception component 902, depicted in FIG. 9) may receive, from a network entity, an indication that configures a PEI response for one or more of: a UE subgroup; a paging occasion; or a beam direction, and receive, from the network entity, a PEI, as described above.

As further shown in FIG. 7, in some aspects, process 700 may include transmitting, to the network entity, the PEI response based at least in part on the PEI and the indication that configures the PEI response (block 720). For example, the UE (e.g., using communication manager 140 and/or transmission component 904, depicted in FIG. 9) may transmit, to the network entity, the PEI response based at least in part on the PEI and the indication that configures the PEI response, as described above.

As further shown in FIG. 7, in some aspects, process 700 may include receiving, from the network entity and during the paging occasion, a paging indication based at least in part on the PEI response (block 730). For example, the UE (e.g., using communication manager 140 and/or reception component 902, depicted in FIG. 9) may receive, from the network entity and during the paging occasion, a paging indication based at least in part on the PEI response, as described above.

Process 700 may include additional aspects, such as any single aspect or any combination of aspects described below and/or in connection with one or more other processes described elsewhere herein.

In a first aspect, the PEI is configured to dynamically activate or deactivate the PEI response using a single-bit flag.

In a second aspect, alone or in combination with the first aspect, the PEI is configured to dynamically activate or deactivate, using a bitmap, the PEI response for the one or more of the UE subgroup, the paging occasion, or the beam direction.

In a third aspect, alone or in combination with one or more of the first and second aspects, the PEI response is configured semi-statically via system information or dedicated RRC signaling for the one or more of the UE subgroup, the paging occasion, or the beam direction.

In a fourth aspect, alone or in combination with one or more of the first through third aspects, process 700 includes transmitting, to the network entity, capability signaling indicating that the UE supports the PEI response, wherein the UE is expected to monitor for the PEI and transmit the PEI response based at least in part on the capability signaling.

In a fifth aspect, alone or in combination with one or more of the first through fourth aspects, process 700 includes receiving, from the network entity, a TRS prior to or after the paging occasion, wherein the TRS is triggered by a reception of the PEI response.

In a sixth aspect, alone or in combination with one or more of the first through fifth aspects, the TRS is an aperiodic TRS or a periodic TRS, a TRS configuration associated with the TRS is based at least in part on an RRC configuration, the TRS is a common TRS or a dedicated TRS, the PEI indicates whether the common TRS is available, whether the dedicated TRS is supported, or whether the dedicated TRS is available, and the dedicated TRS is associated with a validity duration that is UE-specific, beam-specific, or UE-subgroup-specific.

In a seventh aspect, alone or in combination with one or more of the first through sixth aspects, process 700 includes receiving, from the network entity, a CSI-RS prior to or after the paging occasion, wherein the CSI-RS is triggered by a reception of the PEI response.

In an eighth aspect, alone or in combination with one or more of the first through seventh aspects, the CSI-RS is an aperiodic CSI-RS or a periodic CSI-RS, the CSI-RS is a common CSI-RS or a dedicated CSI-RS, the CSI-RS is associated with a repetition, the PEI indicates whether the common CSI-RS is available, whether the dedicated CSI-RS is supported, or whether the dedicated CSI-RS is available, and the dedicated CSI-RS is associated with a validity duration that is UE-specific, beam-specific, or UE-subgroup-specific.

In a ninth aspect, alone or in combination with one or more of the first through eighth aspects, the PEI response is based at least in part on a paging attempt count being less than an intended quantity of paging attempts, based at least in part on the paging attempt count being equal to one, or based at least in part on the paging attempt count being less than the intended quantity of paging attempts minus a first predefined value.

In a tenth aspect, alone or in combination with one or more of the first through ninth aspects, the PEI response is based at least in part on a value associated with a paging priority being less than a second predefined value.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
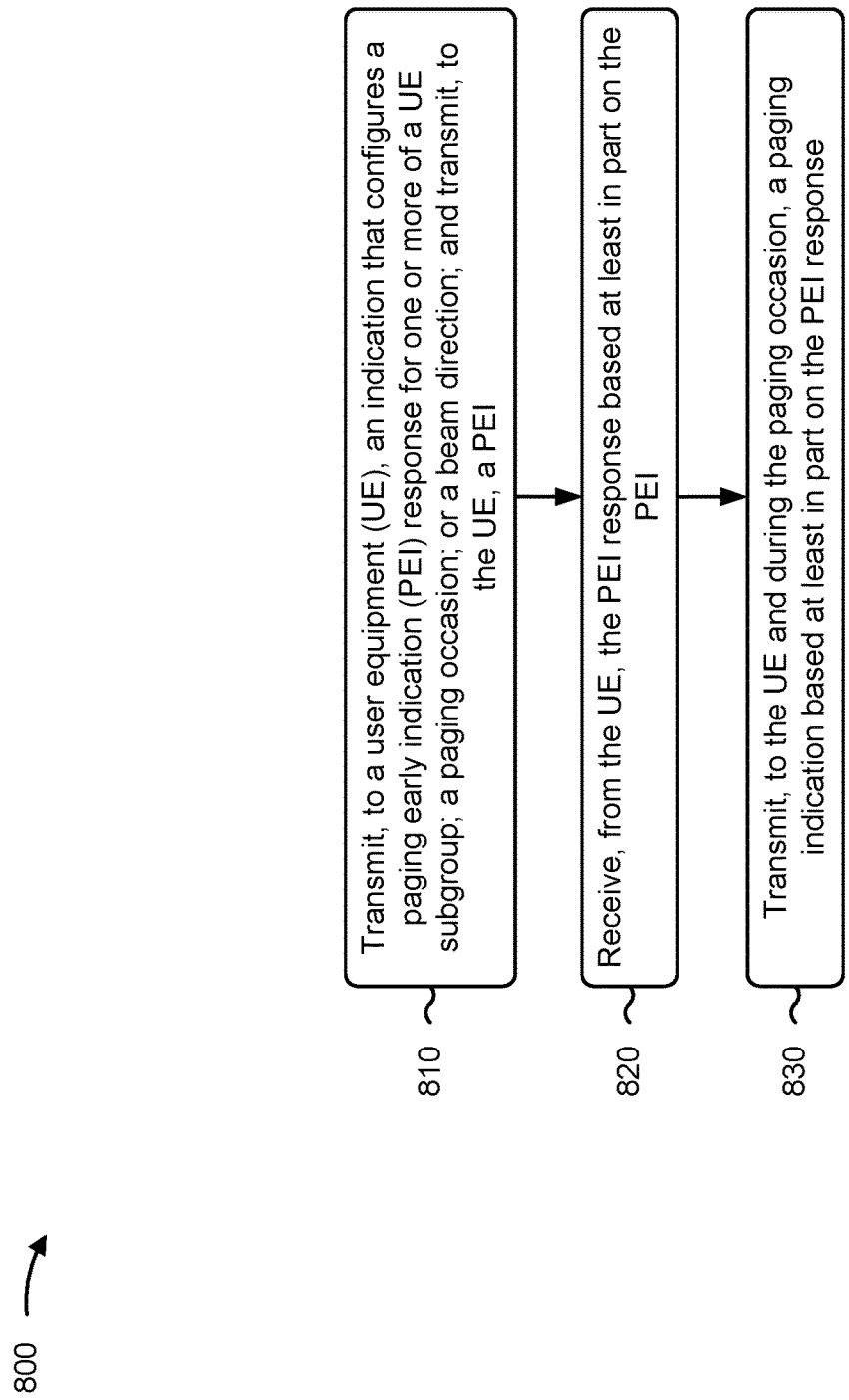

FIG. 8 is a diagram illustrating an example process 800 performed, for example, by a network entity, in accordance with the present disclosure. Example process 800 is an example where the network entity (e.g., network entity 110) performs operations associated with PEI responses.

As shown in FIG. 8, in some aspects, process 800 may include transmitting, to a UE, an indication that configures a PEI response for one or more of: a UE subgroup; a paging occasion; or a beam direction, and transmitting, to the UE, a PEI (block 810).

Figure 10:
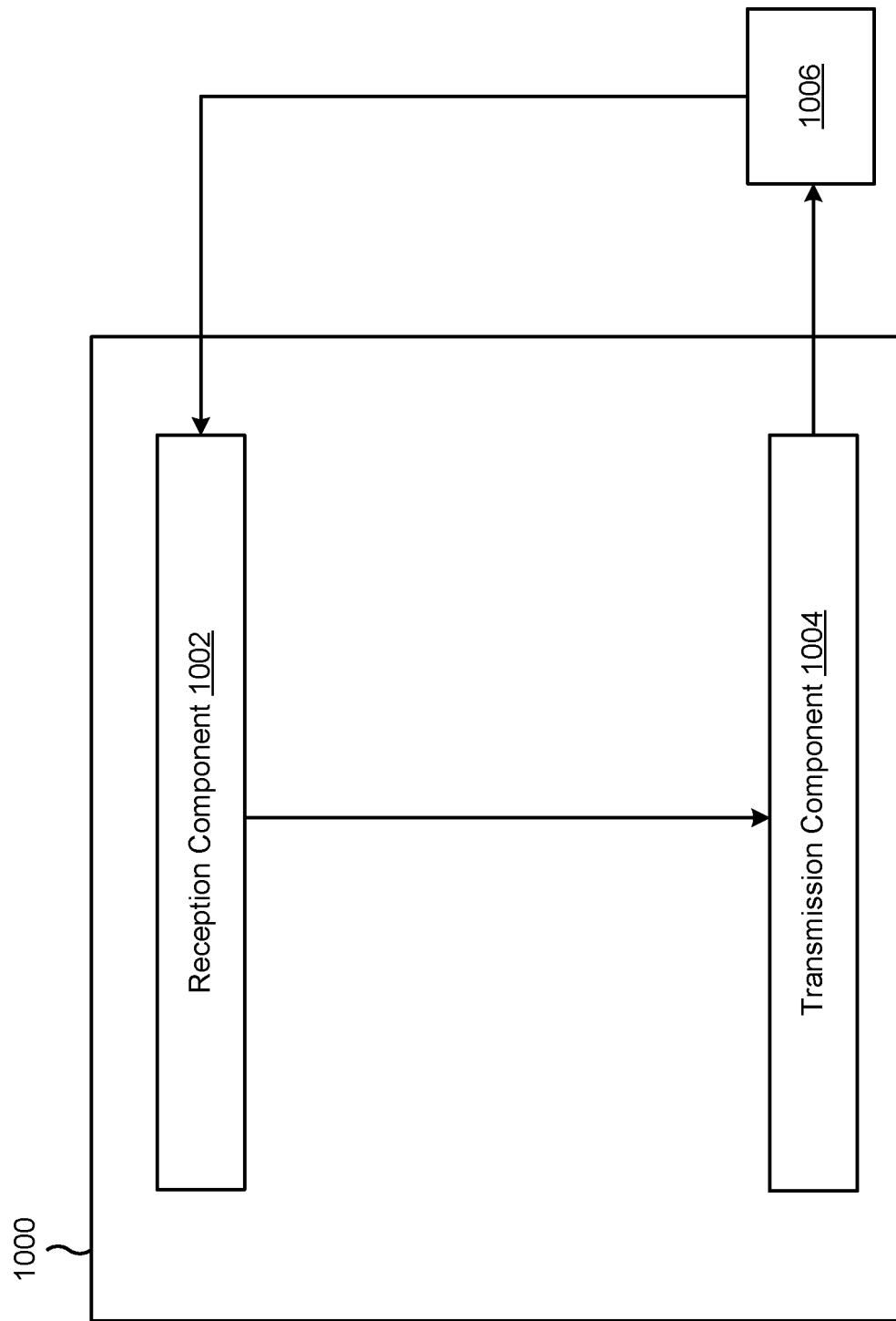

For example, the network entity (e.g., using communication manager 150 and/or transmission component 1004, depicted in FIG. 10) may transmit, to a UE, an indication that configures a PEI response for one or more of: a UE subgroup; a paging occasion; or a beam direction, and transmit, to the UE, a PEI, as described above.

As further shown in FIG. 8, in some aspects, process 800 may include receiving, from the UE, the PEI response based at least in part on the PEI and the indication that configures the PEI response (block 820). For example, the network entity (e.g., using communication manager 150 and/or reception component 1002, depicted in FIG. 10) may receive, from the UE, the PEI response based at least in part on the PEI and the indication that configures the PEI response, as described above.

As further shown in FIG. 8, in some aspects, process 800 may include transmitting, to the UE and during the paging occasion, a paging indication based at least in part on the PEI response (block 830). For example, the network entity (e.g., using communication manager 150 and/or transmission component 1004, depicted in FIG. 10) may transmit, to the UE and during the paging occasion, a paging indication based at least in part on the PEI response, as described above.

Process 800 may include additional aspects, such as any single aspect or any combination of aspects described below and/or in connection with one or more other processes described elsewhere herein.

In a first aspect, process 800 includes receiving, from the UE, capability signaling indicating that the UE supports the PEI response.

In a second aspect, alone or in combination with the first aspect, process 800 includes transmitting, to the UE, a TRS prior or after to the paging occasion, wherein the TRS is triggered by a reception of the PEI response, or transmitting, to the UE, a CSI-RS prior to or after the paging occasion, wherein the CSI-RS is triggered by the reception of the PEI response.

In a third aspect, alone or in combination with one or more of the first and second aspects, the network entity is a first network entity, and process 800 includes transmitting, to a second network entity, signaling that indicates one or more of whether the PEI response is to be implemented for paging the UE, or criteria to be satisfied for the PEI response to be implemented, and the signaling is one or more of UE-specific, cell-specific, or beam-specific.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
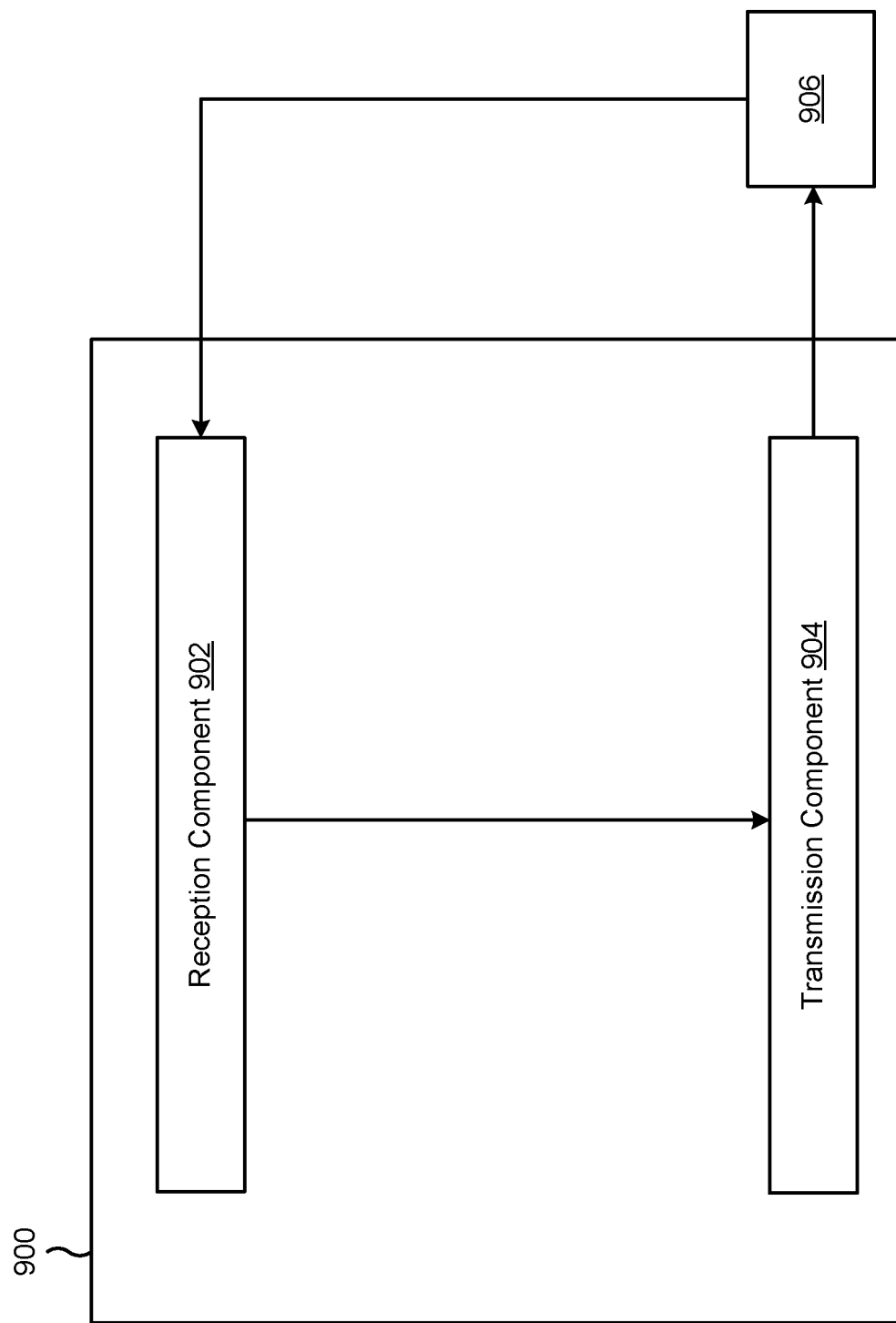
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network entity, or another wireless communication device) using the reception component 902 and the transmission component 904.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network entity, an indication that configures a PEI response for one or more of a UE subgroup; a paging occasion; or a beam direction. The reception component 902 may receive, from the network entity, a PEI. The transmission component 904 may transmit, to the network entity, the PEI response based at least in part on the PEI and the indication that configures the PEI response. The reception component 902 may receive, from the network entity and during the paging occasion, a paging indication based at least in part on the PEI response.

The transmission component 904 may transmit, to the network entity, capability signaling indicating that the UE supports the PEI response, wherein the UE is expected to monitor for the PEI and transmit the PEI response based at least in part on the capability signaling. The reception component 902 may receive, from the network entity, a TRS prior to or after the paging occasion, wherein the TRS is triggered by a reception of the PEI response. The reception component 902 may receive, from the network entity, a CSI-RS prior to or after the paging occasion, wherein the CSI-RS is triggered by a reception of the PEI response.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, or another wireless communication device) using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit, to a UE, an indication that configures a PEI response for one or more of a UE subgroup; a paging occasion; or a beam direction. The transmission component 1004 may transmit, to the UE, a PEI. The reception component 1002 may receive, from the UE, the PEI response based at least in part on the PEI and the indication that configures the PEI response. The transmission component 1004 may transmit, to the UE and during the paging occasion, a paging indication based at least in part on the PEI response.

The reception component 1002 may receive, from the UE, capability signaling indicating that the UE supports the PEI response. The transmission component 1004 may transmit, to the UE, a TRS prior to or after the paging occasion, wherein the TRS is triggered by a reception of the PEI response. The transmission component 1004 may transmit, to the UE, a CSI-RS prior to or after the paging occasion, wherein the CSI-RS is triggered by the reception of the PEI response.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, an indication that configures a paging early indication (PEI) response for one or more of: a UE subgroup; a paging occasion; or a beam direction; receiving, from the network entity, a PEI; transmitting, to the network entity, the PEI response based at least in part on the PEI and the indication that configures the PEI response; and receiving, from the network entity and during the paging occasion, a paging indication based at least in part on the PEI response.

Aspect 2: The method of Aspect 1, wherein the PEI is configured to dynamically activate or deactivate the PEI response using a single-bit flag.

Aspect 3: The method of any of Aspects 1 through 2, wherein the PEI is configured to dynamically activate or deactivate, using a bitmap, the PEI response for the one or more of: the UE subgroup, the paging occasion, or the beam direction.

Aspect 4: The method of any of Aspects 1 through 3, wherein the PEI response is configured semi-statically via system information or dedicated radio resource control signaling for the one or more of: the UE subgroup, the paging occasion, or the beam direction.

Aspect 5: The method of any of Aspects 1 through 4, further comprising: transmitting, to the network entity, capability signaling indicating that the UE supports the PEI response, wherein the UE is expected to monitor for the PEI and transmit the PEI response based at least in part on the capability signaling.

Aspect 6: The method of any of Aspects 1 through 5, further comprising: receiving, from the network entity, a tracking reference signal (TRS) prior to or after the paging occasion, wherein the TRS is triggered by a reception of the PEI response.

Aspect 7: The method of Aspect 6, wherein: the TRS is an aperiodic TRS or a periodic TRS; a TRS configuration associated with the TRS is based at least in part on a radio resource control configuration; the TRS is a common TRS or a dedicated TRS; the PEI indicates whether the common TRS is available, whether the dedicated TRS is supported, or whether the dedicated TRS is available; and the dedicated TRS is associated with a validity duration that is UE-specific, beam-specific, or UE-subgroup-specific.

Aspect 8: The method of any of Aspects 1 through 7, further comprising: receiving, from the network entity, a channel state information reference signal (CSI-RS) prior to or after the paging occasion, wherein the CSI-RS is triggered by a reception of the PEI response.

Aspect 9: The method of Aspect 8, wherein: the CSI-RS is an aperiodic CSI-RS or a periodic CSI-RS; the CSI-RS is a common CSI-RS or a dedicated CSI-RS; the CSI-RS is associated with a repetition; the PEI indicates whether the common CSI-RS is available, whether the dedicated CSI-RS is supported, or whether the dedicated CSI-RS is available; and the dedicated CSI-RS is associated with a validity duration that is UE-specific, beam-specific, or UE-subgroup-specific.

Aspect 10: The method of any of Aspects 1 through 1, wherein PEI response is based at least in part on a paging attempt count being less than an intended quantity of paging attempts, based at least in part on the paging attempt count being equal to one, or based at least in part on the paging attempt count being less than the intended quantity of paging attempts minus a first predefined value.

Aspect 11: The method of any of Aspects 1 through 1, wherein PEI response is based at least in part on a value associated with a paging priority being less than a second predefined value.

Aspect 12: A method of wireless communication performed by a network entity, comprising: transmitting, to a user equipment (UE), an indication that configures a paging early indication (PEI) response for one or more of: a UE subgroup; a paging occasion; or a beam direction; transmitting, to the UE, a PEI; receiving, from the UE, the PEI response based at least in part on the PEI and the indication that configures the PEI response; and transmitting, to the UE and during the paging occasion, a paging indication based at least in part on the PEI response.

Aspect 13: The method of Aspect 12, further comprising: receiving, from the UE, capability signaling indicating that the UE supports the PEI response.

Aspect 14: The method of any of Aspects 12 through 13, further comprising: transmitting, to the UE, a tracking reference signal (TRS) prior to or after the paging occasion, wherein the TRS is triggered by a reception of the PEI response; or transmitting, to the UE, a channel state information reference signal (CSI-RS) prior to or after the paging occasion, wherein the CSI-RS is triggered by the reception of the PEI response.

Aspect 15: The method of any of Aspects 12 through 14, wherein the network entity is a first network entity, and further comprising: receiving, from a second network entity, signaling that indicates one or more of: whether the PEI response is to be implemented for paging the UE, or criteria to be satisfied for the PEI response to be implemented, and wherein the signaling is one or more of UE-specific, cell-specific, or beam-specific.

Aspect 16: An apparatus for wireless communication at a device, comprising a processor; memory coupled with the processor; and instructions stored in the memory and executable by the processor to cause the apparatus to perform the method of one or more of Aspects 1-11.

Aspect 17: A device for wireless communication, comprising a memory and one or more processors coupled to the memory, the one or more processors configured to perform the method of one or more of Aspects 1-11.

Aspect 18: An apparatus for wireless communication, comprising at least one means for performing the method of one or more of Aspects 1-11.

Aspect 19: A non-transitory computer-readable medium storing code for wireless communication, the code comprising instructions executable by a processor to perform the method of one or more of Aspects 1-11.

Aspect 20: A non-transitory computer-readable medium storing a set of instructions for wireless communication, the set of instructions comprising one or more instructions that, when executed by one or more processors of a device, cause the device to perform the method of one or more of Aspects 1-11.

Aspect 21: An apparatus for wireless communication at a device, comprising a processor; memory coupled with the processor; and instructions stored in the memory and executable by the processor to cause the apparatus to perform the method of one or more of Aspects 12-15.

Aspect 22: A device for wireless communication, comprising a memory and one or more processors coupled to the memory, the one or more processors configured to perform the method of one or more of Aspects 12-15.

Aspect 23: An apparatus for wireless communication, comprising at least one means for performing the method of one or more of Aspects 12-15.

Aspect 24: A non-transitory computer-readable medium storing code for wireless communication, the code comprising instructions executable by a processor to perform the method of one or more of Aspects 12-15.

Aspect 25: A non-transitory computer-readable medium storing a set of instructions for wireless communication, the set of instructions comprising one or more instructions that, when executed by one or more processors of a device, cause the device to perform the method of one or more of Aspects 12-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a one or more memories; and
   one or more processors, coupled to the one or more memories, individually or collectively, configured to:
     receive, from a network entity, an indication that configures a paging early indication (PEI) response for one or more of:
       a UE subgroup;
       a paging occasion; or
       a beam direction;
     receive, from the network entity, a PEI;
     transmit, to the network entity, the PEI response based at least in part on the PEI and the indication that configures the PEI response; and
     receive, from the network entity and during the paging occasion, a paging indication based at least in part on the PEI response.

2. The apparatus of claim 1, wherein the PEI is configured to dynamically activate or deactivate the PEI response using a single-bit flag.

3. The apparatus of claim 1, wherein the PEI is configured to dynamically activate or deactivate, using a bitmap, the PEI response for the one or more of: the UE subgroup, the paging occasion, or the beam direction.

4. The apparatus of claim 1, wherein the PEI response is configured semi-statically via system information or dedicated radio resource control signaling for the one or more of: the UE subgroup, the paging occasion, or the beam direction.

5. The apparatus of claim 1, wherein the one or more processors are further configured to:
   transmit, to the network entity, capability signaling indicating that the UE supports the PEI response, wherein the UE is expected to monitor for the PEI and transmit the PEI response based at least in part on the capability signaling.

6. The apparatus of claim 1, wherein the one or more processors are further configured to:
   receive, from the network entity, a tracking reference signal (TRS) prior to or after the paging occasion, wherein the TRS is triggered by a reception of the PEI response.

7. The apparatus of claim 6, wherein:
   the TRS is an aperiodic TRS or a periodic TRS;
   a TRS configuration associated with the TRS is based at least in part on a radio resource control configuration;
   the TRS is a common TRS or a dedicated TRS;
   the PEI indicates whether the common TRS is available, whether the dedicated TRS is supported, or whether the dedicated TRS is available; and
   the dedicated TRS is associated with a validity duration that is UE-specific, beam-specific, or UE-subgroup-specific.

8. The apparatus of claim 1, wherein the one or more processors are further configured to:
   receive, from the network entity, a channel state information reference signal (CSI-RS) prior to or after the paging occasion, wherein the CSI-RS is triggered by a reception of the PEI response.

9. The apparatus of claim 8, wherein:
   the CSI-RS is an aperiodic CSI-RS or a periodic CSI-RS;
   the CSI-RS is a common CSI-RS or a dedicated CSI-RS;
   the CSI-RS is associated with a repetition;
   the PEI indicates whether the common CSI-RS is available, whether the dedicated CSI-RS is supported, or whether the dedicated CSI-RS is available; and
   the dedicated CSI-RS is associated with a validity duration that is UE-specific, beam-specific, or UE-subgroup-specific.

10. The apparatus of claim 1, wherein the PEI response is based at least in part on a paging attempt count being less than an intended quantity of paging attempts, based at least in part on the paging attempt count being equal to one, or based at least in part on the paging attempt count being less than the intended quantity of paging attempts minus a first predefined value.

11. The apparatus of claim 1, wherein the PEI response is based at least in part on a value associated with a paging priority being less than a second predefined value.

12. An apparatus for wireless communication at a network entity, comprising:
    one or more memories; and
    one or more processors, coupled to the one or more memories, individually or collectively, configured to:
      transmit, to a user equipment (UE), an indication that configures a paging early indication (PEI) response for one or more of:
        a UE subgroup;
        a paging occasion; or a beam direction;
transmit, to the UE, a PEI;
receive, from the UE, the PEI response based at least in part on the PEI and the indication that configures the PEI response; and
transmit, to the UE and during the paging occasion, a paging indication based at least in part on the PEI response.

13. The apparatus of claim 12, wherein the one or more processors are further configured to:
receive, from the UE, capability signaling indicating that the UE supports the PEI response.

14. The apparatus of claim 12, wherein the one or more processors are further configured to:
transmit, to the UE, a tracking reference signal (TRS) prior to or after the paging occasion, wherein the TRS is triggered by a reception of the PEI response; or
transmit, to the UE, a channel state information reference signal (CSI-RS) prior to or after the paging occasion, wherein the CSI-RS is triggered by the reception of the PEI response.

15. The apparatus of claim 12, wherein the network entity is a first network entity, and wherein the one or more processors are further configured to:
receive, from a second network entity, signaling that indicates one or more of: whether the PEI response is to be implemented for paging the UE, or criteria to be satisfied for the PEI response to be implemented, and wherein the signaling is one or more of UE-specific, cell-specific, or beam-specific.

16. A method of wireless communication performed by a user equipment (UE), comprising:
receiving, from a network entity, an indication that configures a paging early indication (PEI) response for one or more of:
a UE subgroup;
a paging occasion; or a beam direction;
receiving, from the network entity, a PEI;
transmitting, to the network entity, the PEI response based at least in part on the PEI and the indication that configures the PEI response; and
receiving, from the network entity and during the paging occasion, a paging indication based at least in part on the PEI response.

17. The method of claim 16, wherein the PEI is configured to dynamically activate or deactivate the PEI response using a single-bit flag.

18. The method of claim 16, wherein the PEI is configured to dynamically activate or deactivate, using a bitmap, the PEI response for the one or more of: the UE subgroup, the paging occasion, or the beam direction.

19. The method of claim 16, wherein the PEI response is configured semi-statically via system information or dedicated radio resource control signaling for the one or more of: the UE subgroup, the paging occasion, or the beam direction.

20. The method of claim 16, further comprising:
transmitting, to the network entity, capability signaling indicating that the UE supports the PEI response, wherein the UE is expected to monitor for the PEI and transmit the PEI response based at least in part on the capability signaling.

21. The method of claim 16, further comprising:
receiving, from the network entity, a tracking reference signal (TRS) prior to or after the paging occasion, wherein the TRS is triggered by a reception of the PEI response.

22. The method of claim 21, wherein:
the TRS is an aperiodic TRS or a periodic TRS;
a TRS configuration associated with the TRS is based at least in part on a radio resource control configuration;
the TRS is a common TRS or a dedicated TRS;
the PEI indicates whether the common TRS is available, whether the dedicated TRS is supported, or whether the dedicated TRS is available; and
the dedicated TRS is associated with a validity duration that is UE-specific, beam-specific, or UE-subgroup-specific.

23. The method of claim 16, further comprising:
receiving, from the network entity, a channel state information reference signal (CSI-RS) prior to or after the paging occasion, wherein the CSI-RS is triggered by a reception of the PEI response.

24. The method of claim 23, wherein:
the CSI-RS is an aperiodic CSI-RS or a periodic CSI-RS;
the CSI-RS is a common CSI-RS or a dedicated CSI-RS;
the CSI-RS is associated with a repetition;
the PEI indicates whether the common CSI-RS is available, whether the dedicated CSI-RS is supported, or whether the dedicated CSI-RS is available; and
the dedicated CSI-RS is associated with a validity duration that is UE-specific, beam-specific, or UE-subgroup-specific.

25. The method of claim 16, wherein PEI response is based at least in part on a paging attempt count being less than an intended quantity of paging attempts, based at least in part on the paging attempt count being equal to one, or based at least in part on the paging attempt count being less than the intended quantity of paging attempts minus a first predefined value.

26. The method of claim 16, wherein PEI response is based at least in part on a value associated with a paging priority being less than a second predefined value.

27. A method of wireless communication performed by a network entity, comprising:
transmitting, to a user equipment (UE), an indication that configures a paging early indication (PEI) response for one or more of:
a UE subgroup;
a paging occasion; or
a beam direction;
transmitting, to the UE, a PEI;
receiving, from the UE, the PEI response based at least in part on the PEI and the indication that configures the PEI response; and
transmitting, to the UE and during the paging occasion, a paging indication based at least in part on the PEI response.

28. The method of claim 27, further comprising:
receiving, from the UE, capability signaling indicating that the UE supports the PEI response.

29. The method of claim 27, further comprising:
transmitting, to the UE, a tracking reference signal (TRS) prior to or after the paging occasion, wherein the TRS is triggered by a reception of the PEI response; or
transmitting, to the UE, a channel state information reference signal (CSI-RS) prior to or after the paging occasion, wherein the CSI-RS is triggered by the reception of the PEI response.

30. The method of claim 27, wherein the network entity is a first network entity, and further comprising:
receiving, from a second network entity, signaling that indicates one or more of: whether the PEI response is to be implemented for paging the UE, or criteria to be satisfied for the PEI response to be implemented, and wherein the signaling is one or more of UE-specific, cell-specific, or beam-specific.

* * * * *